United States Patent [19]

Rossio et al.

[11] Patent Number: 5,216,041

[45] Date of Patent: * Jun. 1, 1993

[54] ENERGY ABSORBING, WATER BLOWN, RIGID POLYURETHANE FOAM

[75] Inventors: Richard C. Rossio, Troy; Mark A. Easterle, Rochester; Michael L. Jackson, Allen Park, all of Mich.

[73] Assignee: BASF Corporation, Parsippany, N.J.

[*] Notice: The portion of the term of this patent subsequent to Sep. 1, 2009 has been disclaimed.

[21] Appl. No.: 894,034

[22] Filed: Jun. 4, 1992

Related U.S. Application Data

[63] Continuation-in-part of Ser. No. 795,453, Nov. 21, 1991, Pat. No. 5,143,941, which is a continuation-in-part of Ser. No. 634,643, Dec. 27, 1990.

[51] Int. Cl.⁵ .............................................. C08J 9/34
[52] U.S. Cl. ................................. 521/137; 264/45.5; 521/51; 521/111; 521/112; 521/174
[58] Field of Search ............... 521/137, 51, 111, 112, 521/174

[56] References Cited

U.S. PATENT DOCUMENTS

| | | | |
|---|---|---|---|
| 4,116,893 | 9/1978 | Flanagan | 521/137 |
| 4,190,712 | 2/1980 | Flanagan | 521/137 |
| 4,212,954 | 7/1980 | Nomura et al. | 521/159 |
| 4,282,330 | 8/1981 | Austin | 521/118 |
| 4,585,807 | 4/1986 | Christman | 521/167 |
| 4,614,754 | 9/1986 | Christman | 521/167 |
| 4,644,563 | 2/1987 | Ohishi et al. | 375/17 |
| 4,696,954 | 9/1987 | Pritchard et al. | 521/167 |
| 4,722,946 | 2/1988 | Hostettler | 521/158 |
| 4,866,102 | 9/1989 | Pray et al. | 521/137 |
| 4,883,825 | 11/1989 | Westfall et al. | 521/174 |
| 4,970,243 | 11/1990 | Jacobs et al. | 521/174 |

OTHER PUBLICATIONS

SAE Article 910404–Fundamental Studies of Polyurethane Foam for Energy Absorption in Automotive Interiors.
Thompson–Colen, J; Huber, M; Liddle, J Feb. 1991.

Primary Examiner—Morton Foelak
Attorney, Agent, or Firm—Martin P. Connaughton

[57] ABSTRACT

The invention relates to energy absorbing, water blown, rigid polyurethane foams. The foams of the present invention are low density, predominantly open-celled foams which exhibit a relatively constant consistency of compressive strength over deflection. Such foams are suitable as light weight alternatives in traditional energy absorbing applications.

8 Claims, No Drawings

ENERGY ABSORBING, WATER BLOWN, RIGID POLYURETHANE FOAM

This is a continuation-in-part of application Ser. No. 795,453 filed Nov. 21, 1991, now U.S. Pat. No. 5,143,941, which is a continuation-in-part of application Ser. No. 634,643 filed Dec. 27, 1990, which are herein incorporated by reference.

FIELD OF THE INVENTION

The invention relates to energy absorbing rigid polyurethane foam compositions. Specifically these are low density, predominantly open celled, water blown rigid polyurethane foams which exhibit minimal spring back or hysteresis characteristics. Such foams are suitable as lightweight alternatives for traditional energy absorbing applications, such as side impact bolsters in automobile doors. The foams of the present invention exhibit properties comparable to energy absorbing foams using chlorinated fluorocarbons as the blowing agent.

DESCRIPTION OF THE RELATED ART

U.S. Pat. No. 4,866,102 describes moldable energy absorbing rigid polyurethane foam compositions which are prepared by the reaction of a graft polymer dispersion in a polyoxyalkylene polyether polyol with an alkylene oxide adduct of toluenediamine or diaminodiphenylmethane with an organic polyisocyanate in the presence of a crosslinking agent and water with an additional blowing agent. Similarly, U.S. Pat. Nos. 4,116,893; 4,190,712; 4,212,954; and 4,282,330 also describe energy absorbing foams utilizing graft polymer dispersions. U.S. Pat. No. 4,722,946 describes the production of energy attenuating viscoelastic polyurethane elastomers and foams, comprising mixtures of linear and branched polyol intermediates, polyisocyanates, and optionally, extenders, blowing agents, and the like, in the presence of a catalyst whereby the isocyanate index is varied from about 65 to about 85. U.S. Pat. No. 4,644,563 describes a method of shoring a geological formation which comprises preparing a rigid polyurethane foam which exhibits nearly constant strain with increasing stress in compression. U.S. Pat. No. 4,696,954 describes the preparation of molded polyurethane foams characterized by high impact strength and good thermal stability. U.S. Pat. No. 4,614,754 describes a high density rigid polyurethane foam which exhibits nearly constant strain with increasing stress in compression. U.S. Pat. No. 4,585,807 describes rigid polyurethane foams employing oxyalkylated ethylenediamine. SAE Article 910404, "Fundamental Studies of Polyurethane Foam for Energy Absorption in Automotive Interiors," discusses, in general, energy-absorbing polyurethane foams.

SUMMARY OF THE INVENTION

The present invention relates to energy absorbing rigid polyurethane foam compositions, the process for preparing said foams and, the resultant articles of manufacture, e.g. side impact bolsters for automotive applications. The foams of the present invention are predominantly open celled, energy absorbing, rigid polyurethane foams essentially free of chlorinated fluorocarbons and volatile organic carbon blowing agents. Yet the foams of the present invention have characteristics, such as constant crush strength and minimal spring back or hysteresis, comparable to present-day energy absorbing rigid polyurethane foams containing fluorocarbons and volatile organic carbons.

DETAILED DESCRIPTION OF THE INVENTION

Under ever increasing governmental regulations addressing both personal safety and environmental concerns auto manufacturers have been put in a position where they must meet stringent impact requirements, maintain vehicle weight and reduce the use of materials having a detrimental effect on the environment. Energy absorbing rigid polyurethane foams have provided a partial solution in some impact performance requirements areas; e.g. energy absorbing fillers which can be used to stiffen door support frames, thus aiding in preserving the structural integrity of the passenger compartment of an automobile or as bolsters which can reduce effects of secondary collision (occupant-to-interior). However, the foams exhibiting the desired impact characteristics utilize chlorinated fluorocarbons as the foaming agent. That fact alone reduces their desirability in light of mandates to reduce and eventually eliminate the use of CFCs.

In the instant invention it has been found that water blown rigid polyurethane foams can be produced which exhibit energy absorbing characteristics comparable to the CFC blown rigid polyurethane foams. These foams may be employed in energy absorbing applications, such as side impact bolsters in automobiles.

These foams are predominantly open celled; having molded densities ranging from 2.0 pcf to about 4.5 pcf, and a crush strength which remains constant from about 10% to about 70% in loading of up to about 70 psi.

Previously, the foams exhibiting the desired impact characteristics utilized chlorinated fluorocarbons as the foaming agent. Attempts to substitute water into these formulations failed to produce foams exhibiting the same impact characteristics. Some success has been had with certain narrowly defined formulations using water as a blowing agent, and containing a polymer polyol (graft polyol) as necessary elements of the invention. U.S. Pat. Nos. 4,190,712; 4,212,954 and 4,116,893 disclose formulations for flexible or viscoelastic foams.

Surprisingly, it has now been found that foams exhibiting the desired energy absorbing characteristics may be produced from active hydrogen containing compounds or mixtures thereof, organic isocyanates, water, and additives with the proviso that such compounds are generally capable of forming a rigid polyurethane structure. The water must be present in amounts sufficient to act as a blowing agent and a cell opening agent promoting a predominantly open cell structure, yet not be present in amounts great enough to cause the foam to collapse. The amount of water used is highly dependent upon the other formulation components but it has been found that from about 2 weight percent to about 30 weight percent is an effective range. A preferred range of water being from about 6 weight percent to about 15 weight percent.

The polyisocyanates which may be used in the present invention are modified and unmodified polyisocyanates which are well known to those skilled in the art. For the purposes of this invention the term polyisocyanate is used to describe compounds containing, at least two isocyanate groups. Unmodified polyisocyanates include aliphatic or cycloaliphatic and aromatic polyisocyanates. Examples include 2,4- and 2,6-methylcyclohexylenediisocyanate; tetramethylene diisocyanate, cyclohexane diisocyanate, 2,4-toluene diisocyanate, 2,6-toluene diisocyanate, mixtures of 2,4- and 2,6-toluene diisocyanate, naphthalene-1,5-diisocyanate, 1-methoxyphenyl-2,4-diisocyanate. Preferred isocyanates include 4,4'-diphenylmethane diisocyanate (MDI), mixtures of 4,4'- and 2,4-diphenylmethane diisocyanate, and polymeric polyisocyanates such as polymethylene polyphenylenes polyisocyanates (polymeric MDI). Included within the preferred isocyanates are those modified MDI's containing carbodiimide, allophanate, urethane or isocyanurate structures. The more preferred isocyanates are polymeric MDI and mixtures of polymeric MDI and pure 2,4 and 4,4' MDI. These polyisocyanates are prepared by conventional methods known in the art, e.g. phosgenation of the corresponding organic amine.

For purposes of the present invention isocyanates other than the preferred isocyanates may be present in minor amounts.

In the preparation of the polyurethanes of the present invention the isocyanate is reacted with isocyanate reactive hydrogen-containing compounds (polyols are preferred). Hydroxyl group-containing compounds (polyols) useful in the preparation of polyurethanes are described in the *Polyurethane Handbook* in chapter 3, §3.1 pages 42–61; and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di, and trialkanolamines; tetrahydric initiators such as ethylene diamine, propylene diamine, 2,4'-, 2,2'-, and 4,4'-methylenedianiline, toluenediamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used, resulting in block, heteric, and blockheteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example U.S. Pat. Nos. 1,922,451; 2,674,619; 1,922,459; 3,190,927; and 3,346,557.

Polyester polyols also represent polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylenepolyoxypropylene glycols. These lists of dicarboxylic acids and polyols are illustrative only, and not limiting. An excess of polyol should be used to ensure hydroxyl termination. Although carboxyl groups are also reactive with isocyanates. Methods of preparation of such polyester polyols are given in the *Polyurethane Handbook* and in *Polyurethanes: Chemistry and Technology*.

In an especially preferred embodiment, it has also been found that acceptable foams may be produced by adding a graft polymer dispersion to the resin component in place of a portion of the other isocyanate reactive hydrogen-containing compounds, such as the hydroxyl-terminated polyoxyalkylene polyols or polyester polyols. For purposes of the present invention, the graft polymer dispersions are present in amounts of from about 5 weight % to about 30 weight %, preferably from 5 weight % to 25 weight %.

These graft polymer dispersions are prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ehtoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and compounds listed above are illustrative and are not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 60 percent, preferably from 30 percent to 45 percent, based on the total weight of the product. The polymerization occurs at a temperature between about 25° C. and 180° C., preferably from 80° C. to 135° C.

The unsaturated polyols or macromers which may be employed in preparing the graft polymer dispersions may be prepared by the reaction of any conventional polyol such as those described above with an organic compound having both ethylenic unsaturation and a hydroxyl, carboxyl, anhydride, isocyanate or epoxy group or they may be prepared by employed an organic compound having both ethylenic unsaturation ad a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methylacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinyl-cyclohexene-3,4-epoxide, butadiene monoxide, vinyl glycidyl ether (1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1-t-butylazo-1-cyanocylclohexane, persuccinic acid, diisopropyl peroxy dicarbonate, 2,2,'-azobis(2,4-dimethylvaleronitrile), 2-t-butylazo-2-cyano-4-methoxy-4-methylpentane, 2,2'-azo-bis-2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isobutyronitrile, to butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methyl pentane, 2-t-butylazo-2-cyano-4-methylpentane, 2-t-butylazo-2-cyano-butane and lauroyl peroxide. Generally, from about 0.1 percent to about 10 percent, preferably from about 1 percent to about 4 percent, by weight of initiator based on the weight of the monomer will be employed in the process of the invention.

Any suitable catalyst or mixture of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutylin-di-2-ethyl hexonate, potassium hexanoate, stannous oxide, as well as other organometallic compounds such as are disclosed in U.S. Pat. No. 2,846,408.

In some instances, a surface-active agent is necessary for production of polyurethane foam. Numerous surface-active agents have been found satisfactory. Of these, the nonionic surface-active agents such as the well-known silicones have been found particularly desirable when use of a surfactant is necessary. Other surface-active agents which are operative, although not preferred, include polyethylene glycol ethers of long chain alcohols, tertiary amine or alkanol amine salts of long chain alkyl acid sulfate esters, alkyl sulfonic esters, and alkyl arylsulfonic acids. Use of a surfactant in the present invention is optional.

A chain extender and/or crosslinker is used as well in the present invention. These include those compounds having at least two functional groups bearing active hydrogen atoms such as, hydrazine, primary and secondary diamines, amino alcohols, amine acids, hydroxy acids, glycols or mixtures thereof. Glycerin is an example of a preferred compound used as a crosslinker.

Other optional additives which fall within the spirit of the present invention include known pigments, such as carbon black, dyes, stabilizers against aging and weathering, fungistats, bacteriostats, fillers, or flame retarding agents.

If desired, flame retardants may be incorporated in the foams. Among the flame retardants which may be employed are: pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris(2,3-dibromopropyl)phosphate, tris(β-chloroethyl)phosphate, tris(1,2-dichloropropyl)phosphate, bis-(2-chloroethyl) 2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane.

The following illustrates the nature of the invention and are not to be construed as limitations on the scope of the invention. All amounts are in weight % unless otherwise indicated.

Example 1 and comparative examples 2 and 3 were prepared using the following conditions:

| PROCESSING CONDITIONS | |
|---|---|
| Machine | High Pressure |
| Component Temp | |
| Resin °F. | 77 |
| Isocyanate °F. | 77 |
| Mixing Pressure | |
| Resin (bar) | 180 |
| Isocyanate (bar) | 180 |
| Throughput g/sec | 175 |
| Mold Temperature °F. | 100 ± 5 |
| Mold Release | Wax base release agent* |
| Processing Mode | Open Mold Pour |
| Demold Time min | ~6 |

*Silicone was used as the mold release for comparative example 2 and 3.

Example 1 and comparative examples 2 and 3 were injected into the center of a preheated 3×3×1" mold. The mold was closed. When foaming was complete, the parts were demolded, cured at 50% humidity and 73° F. prior to testing. Foam compression testing (ASTM D-1621) at 10% intervals was carried out on all examples at varying weights to determine foam performance characteristics. Example 1 illustrates an embodiment of the present invention wherein a graft polymer dispersion containing foam blown exclusively with water, exhibits energy absorbing characteristics comparable to conventional energy absorbing foams using CFCs as the blowing agent. Comparative example 2 is a currently used energy absorbing foam composition using Freon F-11A (a chlorinated fluorocarbon). Comparative example 3 is a formulation similar to comparative Example 2; however, water is substituted for F-11A.

Examples 4-9 were prepared in the same manner as Example 1 with the exception of the mold size, which was 10×10×2.5". Varying amounts of graft polymer dispersion were used in the formulations of Examples 4-9 and the resulting foam compression testing (ASTM D-1621) data is shown in Table 2.

Although all parts were made using an open mold pour technique, the system is equally amenable to other fabrication methods known to those skilled in the art, e.g. RIM (reaction injection molding).

| Polyol A | was a graft polymer dispersion of acrylonitrile and styrene in a 1:2 ratio, wherein the acrylonitrile-styrene is dispersed in an ethylene oxide-propylene oxide adduct of glycerine. The polymer dispersion has a nominal hydroxyl number of 29. |
|---|---|
| Polyol B | was a propylene oxide adduct of propylene glycol having a nominal hydroxyl number of 260. |
| Polyol C | was a propylene oxide adduct of a mixture of toluene diamine isomers containing predominantly vicinal isomers, having a nominal hydroxyl number of 390. |
| Polyol D | was a graft polymer dispersion of acrylonitrile and styrene in a 2:1 ratio, wherein the acrylonitrile-styrene is dispersed in a propylene oxide adduct of propylene glycol. The polymer dispersion has a nominal hydroxyl number of 69. |
| Polyol E | was a propylene oxide adduct of ethylene-diamine having a nominal hydroxyl number of 770. |
| NIAX L-540 | was a silicone surfactant sold by Union Carbide. |
| NIAX C-174 | was an amine catalyst sold by Union Carbide. |
| DABCO BL-11 | was an amine catalyst sold by Air Products. |
| DABCO 8020 | was an amine catalyst sold by Air Products. |
| DABCO 33LV | was an amine catalyst sold by Air Products. |
| FOMREZ UL-1 | was a tin catalyst sold by Fomrez Corp. |
| F11A | was a chlorinated fluorocarbon sold by Dupont Corporation. |
| ISO A | was a polymeric polymethylene polyphenyl isocyanate having a functionality of about 2.7 and an isocyanate content of about 32% by weight. |

| EXAMPLES 1-3 | | | |
|---|---|---|---|
| | 1 | 2 | 3 |
| RESIN COMPONENT | | | |
| POLYOL A | 15.0 | — | — |
| POLYOL B | 20.5 | — | — |
| POLYOL C | — | 21.56 | 29.29 |
| POLYOL D | — | 30.81 | 41.84 |
| POLYOL E | 50.0 | — | — |
| NIAX L-540 | — | 0.49 | 1.25 |
| NIAX C-174 | — | — | 2.10 |
| DABCO BL-11 | 0.15 | — | — |
| DABCO 33LV | 0.35 | — | — |
| DABCO 8020 | — | 0.92 | — |
| FOMREZ UL-1 | — | 0.02 | — |
| GLYCERINE | 7.0 | 9.24 | 12.55 |
| WATER | 7.0 | — | 12.55 |
| F-11A | — | 36.96 | — |
| ISOCYANATE | | | |
| ISO A | 200* | 89.3 | 119.5 |

*The isocyanate used in Example 1 was the same as that used in Examples 2 and 3 except it had been manufactured by a process which produced a lighter-colored product.

TABLE 1

| Example | Density Molded/Core (pcf) | Strength at Yield (psi) | STRENGTH AT 10% CRUSH (psi) | STRENGTH AT 20% CRUSH (psi) | STRENGTH AT 30% CRUSH (psi) |
|---|---|---|---|---|---|
| 1 | 2.7/2.27 | 22.17 | 21.67 | 22.61 | 23.79 |
| 1 | 2.4/2.03 | 16.78 | 15.83 | 16.66 | 17.68 |
| 1 | 2.53/2.13 | 17.63 | 17.82 | 18.44 | 19.41 |
| 1 | 3.03/2.49 | 31.75 | 31.30 | 31.23 | 31.29 |
| 1 | 3.19/2.64 | 33.59 | 33.94 | 34.64 | 34.81 |
| 1 | 2.88/2.42 | 26.42 | 27.67 | 27.69 | 28.51 |
| 2 | —/2.5-2.8 | 17.84 | 16.57 | 15.10 | 15.70 |
| 3 | —/2.5-2.8 | — | 37.46 | 39.80 | 42.40 |

| STRENGTH AT 40% CRUSH | STRENGTH AT 50% CRUSH | STRENGTH AT 60% CRUSH | STRENGTH AT 70% CRUSH | STRENGTH AT 80% CRUSH |
|---|---|---|---|---|

TABLE 1-continued

| Example | (psi) | (psi) | (psi) | (psi) | (psi) |
|---|---|---|---|---|---|
| 1 | 24.96 | 26.22 | 27.57 | 33.22 | 62.23 |
| 1 | 18.85 | 20.10 | 21.74 | 27.59 | 51.11 |
| 1 | 20.59 | 22.12 | 23.77 | 28.73 | 53.87 |
| 1 | 31.59 | 32.78 | 34.48 | 37.87 | 69.97 |
| 1 | 35.67 | 36.86 | 38.42 | 41.97 | 77.72 |
| 1 | 29.46 | 30.97 | 32.27 | 36.53 | 68.18 |
| 2 | 16.34 | 17.37 | 19.18 | 26.92 | 85.59 |
| 3 | 45.77 | 51.40 | 61.77 | 80+ | 100+ |

| EXAMPLES 4-9 | 4 | 5 | 6 | 7 | 8 | 9 |
|---|---|---|---|---|---|---|
| RESIN COMPONENT | | | | | | |
| POLYOL A | 6.55 | 23.55 | 10.5 | 19.73 | 25.0 | 5.0 |
| POLYOL B | 8.95 | 32.0 | 40.0 | 0 | 17.59 | 23.41 |
| POLYOL E | 70.0 | 30.0 | 35.0 | 65.77 | 42.91 | 57.09 |
| DABCO BL-11 | 0.15 | 0.15 | 0.15 | 0.15 | 0.15 | 0.15 |
| DABCO 33LV | 0.35 | 0.35 | 0.35 | 0.35 | 0.35 | 0.35 |
| GLYCERINE | 7.0 | 7.0 | 7.0 | 7.0 | 7.0 | 7.0 |
| WATER | 7.0 | 7.0 | 7.0 | 7.0 | 7.0 | 7.0 |
| ISOCYANATE | | | | | | |
| ISO A* | 240 | 189 | 200 | 229 | 202 | 227 |

*Same light-colored isocyanate as used in Example 1.

TABLE 2

| EXAMPLE | SAMPLE WEIGHT (g) | STRENGTH AT YIELD (psi) | STRENGTH AT 10% CRUSH (psi) | STRENGTH AT 20% CRUSH (psi) | STRENGTH AT 30% CRUSH (psi) |
|---|---|---|---|---|---|
| 4 | 152 | 16.40 | 16.51 | 17.14 | 17.68 |
| 5 | 156 | 18.15 | 18.07 | 18.05 | 19.81 |
| 6 | 157 | 18.55 | 18.76 | 19.10 | 20.68 |
| 7 | 152 | 16.58 | 11.56 | 12.94 | 14.22 |
| 8 | 155 | — | 16.97 | 17.82 | 18.21 |
| 9 | 157 | 18.11 | 18.06 | 18.72 | 19.62 |

| EXAMPLE | STRENGTH AT 40% CRUSH (psi) | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|---|
| 4 | 18.46 | 20.67 | 25.11 | 38.46 | 65.55 |
| 5 | 20.86 | 23.05 | 28.96 | 44.36 | 75.60 |
| 6 | 22.32 | 24.97 | 29.37 | 45.74 | 81.21 |
| 7 | 16.19 | 16.38 | 17.52 | 28.07 | 47.18 |
| 8 | 20.06 | 22.64 | 26.03 | 36.46 | 71.46 |
| 9 | 21.08 | 23.15 | 26.49 | 38.68 | 74.68 |

We claim:

1. A method of preparing an energy absorbing rigid polyurethane foam, comprising;
   A) reacting in a closed, preheated, prepared mold a formulation capable of producing a predominately open-celled energy absorbing foam, comprising
   i) compounds containing isocyanate reactive hydroxyl groups selected from the group consisting of aliphatic glycols, dihydroxy aromatics, hydroxyl terminated polyether, polyesters, polyacetals, graft polymer dispersions and mixtures thereof, wherein the graft polymer dispersion is present in amounts of from 5 weight % to about 30 weight %, based on the total weight of non-isocyanate components;
   ii) an organic isocyanate selected from the group consisting of 4,4'-diphenylmethane diisocyanate, polymethylene polyphenylene polyisocyanate, modified diphenylmethane diisocyanates, and mixtures thereof, wherein other organic isocyanates may be present in minor amounts;
   iii) a catalyst;
   iv) a blowing agent consisting of water, wherein the water is present in amounts sufficient to cause formation of a predominately open-celled foam, without causing collapse;
   v) a crosslinker; and,
   vi) optionally a surfactant;
   B) demolding and curing said foam, wherein the cured foam has a molded density of from 2.0 to about 4.5 pcf and a crush strength which remains relatively constant from about 10 percent to about 70 percent deflection at loads less than 70 psi.

2. A method as claimed in claim 1, wherein the compounds containing isocyanate reactive hydroxyl groups are a mixture of hydroxyl terminated polyethers and graft polymer dispersions.

3. A method as claimed in claim 2, wherein the hydroxyl terminated polyethers are propylene oxide adducts of propylene glycol.

4. A method as claimed in claim 2, wherein the graft polymer dispersion contains an acrylonitrile-styrene copolymer, in a ratio of 1:2, dispersed in an ethylene oxide-propylene oxide adduct of glycerine.

5. A method as claimed in claim 1, wherein the organic isocyanate is a polymethylene polyphenylene polyisocyanate.

6. A method as claimed in claim 1, wherein the water is present in amounts from about 2 weight % to about 30 weight %.

7. A method as claimed in claim 1, wherein the water is present in amounts from about 6 weight % to about 15 weight %.

8. A method as claimed in claim 1, wherein the graft polymer dispersion is present in amounts from about 5 weight % to about 25 weight %.

* * * * *